(12) United States Patent
Webb et al.

(10) Patent No.: US 7,544,908 B2
(45) Date of Patent: Jun. 9, 2009

(54) CIRCUIT BREAKER CRADLE WITH AN INTERLOCK SYSTEM AND A METHOD OF USING THE SAME

(75) Inventors: John C. Webb, Florence, SC (US); Murray K. Jones, Johnsonville, SC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/144,594

(22) Filed: Jun. 23, 2008

(65) Prior Publication Data

US 2009/0000925 A1 Jan. 1, 2009

Related U.S. Application Data

(60) Provisional application No. 60/946,320, filed on Jun. 26, 2007.

(51) Int. Cl.
*H01H 9/20* (2006.01)
*H01H 9/24* (2006.01)

(52) U.S. Cl. .................. 200/50.24; 200/50.27; 361/608

(58) Field of Classification Search ... 200/50.24–50.27, 200/50.21, 50.01, 400; 361/605, 608, 609, 361/724
See application file for complete search history.

(56) References Cited

U.S. PATENT DOCUMENTS

| | | | |
|---|---|---|---|
| 6,545,859 B2 * | 4/2003 | Leccia | 361/607 |
| 6,951,990 B1 * | 10/2005 | Miller | 200/50.21 |
| 6,998,550 B1 * | 2/2006 | Jur et al. | 200/50.21 |

* cited by examiner

*Primary Examiner*—Kyung Lee
(74) *Attorney, Agent, or Firm*—Paul R. Katterle (57) ABSTRACT

A cradle and a method for adapting a circuit breaker for mounting in a switchgear cabinet having a bus bar system. The cradle includes a frame to which a racking apparatus and a locking apparatus are mounted. The racking apparatus is operable to move the cradle into and out of electrical connection with the bus bar system. The locking apparatus has a first operating state, wherein the locking apparatus prevents the circuit breaker from being disposed in the frame and allows the racking apparatus to operate, and a second operating state, wherein the locking apparatus allows the circuit breaker to be disposed in the frame and prevents the racking apparatus from operating.

18 Claims, 5 Drawing Sheets

CIRCUIT BREAKER CRADLE WITH AN INTERLOCK SYSTEM AND A METHOD OF USING THE SAME

CROSS-REFERENCE TO RELATED APPLICATION

This application claims the benefit of U.S. provisional patent application No. 60/946,320 filed on Jun. 26, 2007, which is hereby incorporated by reference in its entirety.

BACKGROUND OF THE INVENTION

The present invention relates to electrical switchgear, and more particularly, to an adapter system and method for retrofitting existing switchgear with new, removable circuit breakers.

Many types of low- and medium-voltage switchgear systems use circuit breakers that can be withdrawn for maintenance. Typically, such a circuit breaker is moved into and out of a switchgear cell by a racking mechanism having arms disposed on opposing sides of the circuit breakers and which are only movable simultaneously. Further, such a circuit breaker typically has an interlock that prevents the circuit breaker from being moved into or out of connection with the bus bar in the switchgear cell when the circuit breaker is closed.

As a switchgear installation ages, the old circuit breakers mounted therein often need to be replaced. Many times, the manufacturer of the switchgear installation is out of business when replacement is required. Since circuit breakers from different manufacturers are typically not interchangeable, old circuit breakers from defunct manufactures typically cannot be directly replaced by new circuit breakers from current manufacturers. Even for a particular manufacturer, new circuit breakers are typically different in size and operation than old circuit breakers and typically cannot directly replace the old circuit breakers. Thus, the owner of an old switchgear installation who needs to replace old circuit breakers is typically presented with a limited number of options. The owner can replace the entire switchgear installation, extensively modify the new circuit breakers, or extensively modify the switchgear cells, all of which are quite expensive. In some cases, the owner may be able to use adapters or "cradles" to adapt new circuit breakers for use in existing switchgear cells. This latter technique is often referred to as a "cradle-within-a-cradle" technique.

In a "cradle-within-a-cradle" technique, a new circuit breaker is inserted into a cradle which is then removably mounted inside an existing switchgear cell. The cradle moves in and out of the switchgear cell and connects to the switchgear bus bar in substantially the same manner as the old circuit breaker that was previously mounted inside the switchgear cell. Conventionally, the cradle translates the operation of the racking mechanism of the new circuit breaker into a racking operation that is substantially similar to the racking operation of the old circuit breaker and connects the terminals of the new circuit breaker to terminals that are substantially the same as the terminals of the old circuit breaker. A conventional cradle is often complex and does not have an interlock that prevents the cradle from being moved into or out of a switchgear cell when it is carrying a closed circuit breaker.

Based on the foregoing, there is a need for a less complex cradle with an interlock and a method of using the same. The present invention is directed to such a cradle and method.

SUMMARY OF THE INVENTION

In accordance with the present invention, a cradle is provided for adapting a circuit breaker for mounting in a cell of a switchgear cabinet having a bus bar system. The cradle includes a frame for holding the circuit breaker. The frame includes a bottom structure and a pair of opposing side structures that help define a holding space for receiving the circuit breaker. A racking apparatus is mounted to the frame. The racking apparatus is operable to move the cradle between a first position, wherein the cradle is not electrically connected to the bus bar system, and a second position, wherein the cradle is electrically connected to the bus bar system. A locking apparatus is mounted to the frame. The locking apparatus has first and second operating states. When the locking apparatus is in the first operating state, the locking apparatus prevents the circuit breaker from being disposed in the holding space of the frame and allows the racking apparatus to move the cradle between the first and second positions. When the locking apparatus is in the second operating state, the locking apparatus allows the circuit breaker to be disposed in the holding space of the frame and prevents the racking apparatus from moving the cradle between the first and second positions.

Also provided in accordance with the present invention is a method of installing a circuit breaker in a cell of a switchgear cabinet having a pair of tracks disposed in the cell and a bus bar system. The circuit breaker is not adapted for mounting in the cell. In accordance with the method, a cradle is provided. The cradle includes a frame for holding the circuit breaker. The frame includes a plurality of wall structures that help define a holding space for receiving the circuit breaker. A racking apparatus is mounted to the frame and is operable to move the cradle between a first position, wherein the cradle is not electrically connected to the bus bar system, and a second position, wherein the cradle is electrically connected to the bus bar system. At least one pin is provided. Each pin is movably mounted to one of the wall structures and has an inner end portion disposed inside the holding space and an outer end portion disposed outside the holding space. The tracks are moved so as to extend out of the cell and the cradle is placed on the tracks. The cradle and the tracks are moved into the cell. The racking apparatus is actuated to move the cradle to the second position. After the cradle is in the second position, the at least one pin is moved so that the inner end portion of each pin is disposed proximate to the wall structure to which the pin is mounted. The circuit breaker is placed in the holding space of the cradle.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 1:
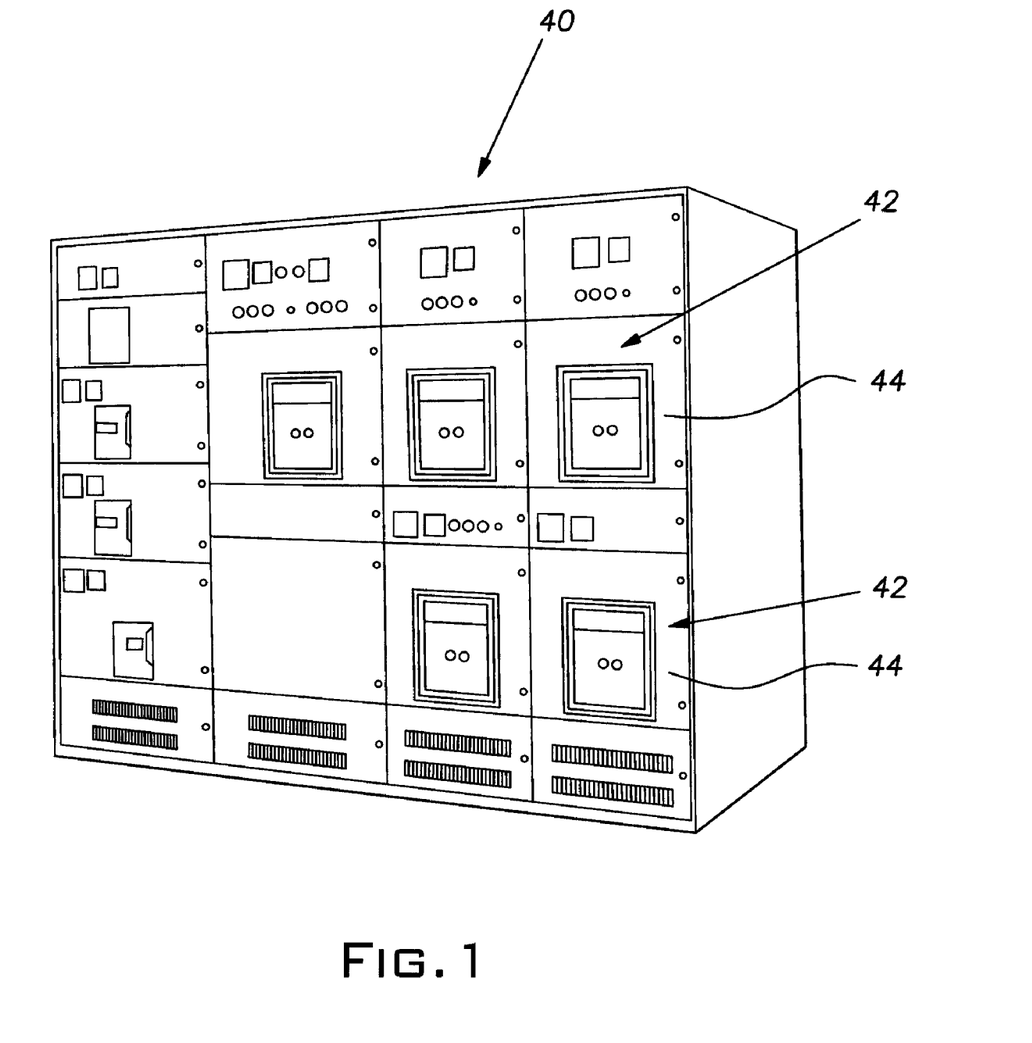
FIG. 1 is a perspective view of a switchgear cabinet in which a cradle embodied in accordance with the present invention may be mounted.
Figure 4:
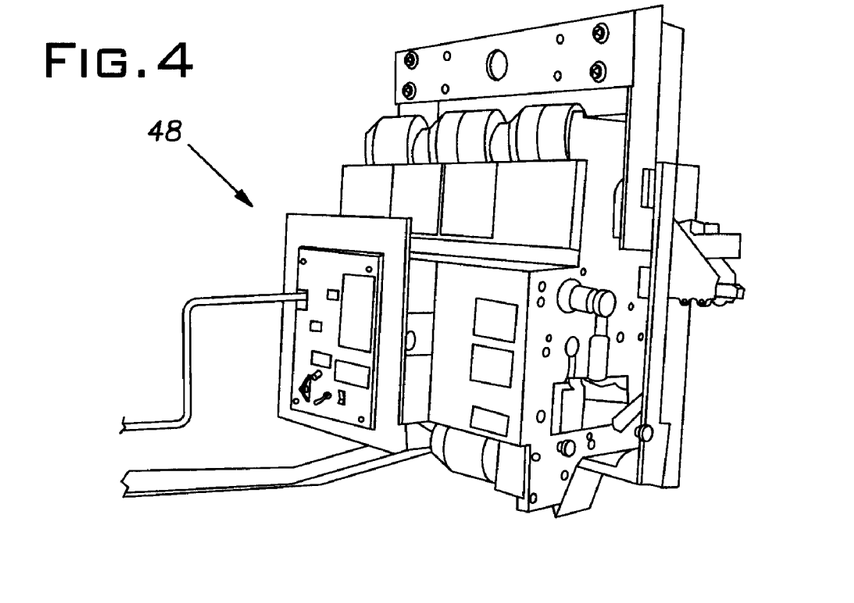
FIG. 4 is a front right side perspective view of a first circuit breaker that is to be replaced.
Figure 5:
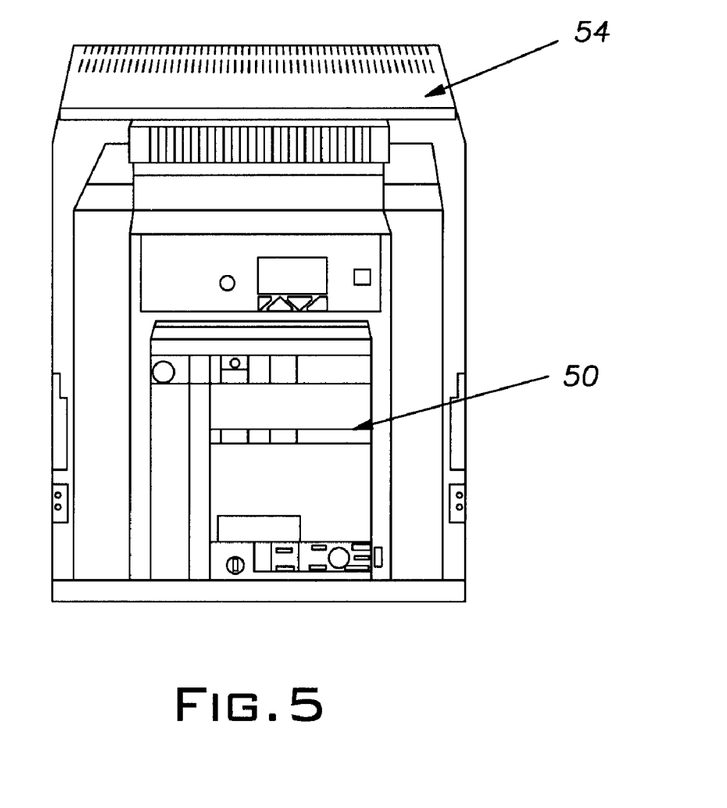
FIG. 5 is a front view of a second circuit breaker mounted inside the cradle, the second circuit breaker replacing the first circuit breaker.

Referring now to FIG. 1 there is shown a switchgear cabinet 40 having a plurality of cells 42 for holding circuit breakers. Each cell 42 is closed by a door 44 having a cut-out through which the front of a circuit breaker may be accessed. A substructure 46 (shown in FIGS. 2-3) is mounted in each cell 42. Each substructure 46 was originally designed and constructed to hold a first circuit breaker 48 (shown in FIG. 4). For purposes of better describing the invention, it should be noted that it is desired to replace each first circuit breaker 48 with a second circuit breaker 50 (shown in FIG. 5). Both the first and second circuit breakers 48, 50 are low voltage circuit breakers, i.e., having a maximum voltage rating of about 600 Volts or less. The first circuit breaker 48 has a racking system that includes a racking arm 21 connected by gearing to a racking handle 8. Rotation of the racking handle 8 moves the racking arm 21, which, in turn, causes the first circuit breaker 48 to move within the substructure 46 between disconnect and connect positions. The second circuit breaker 50 is a molded case circuit breaker and has a different construction and dimensions than the first circuit breaker 48. Although not shown, the second circuit breaker 50 includes two rows of horizontally-extending terminals. The terminals are plate-shaped and extend rearwardly from the back of the second circuit breaker 50. In accordance with the present invention, a cradle 54 (shown best in FIG. 6) is provided to adapt the second circuit breaker 50 for mounting in the substructure 46.

Figure 2:
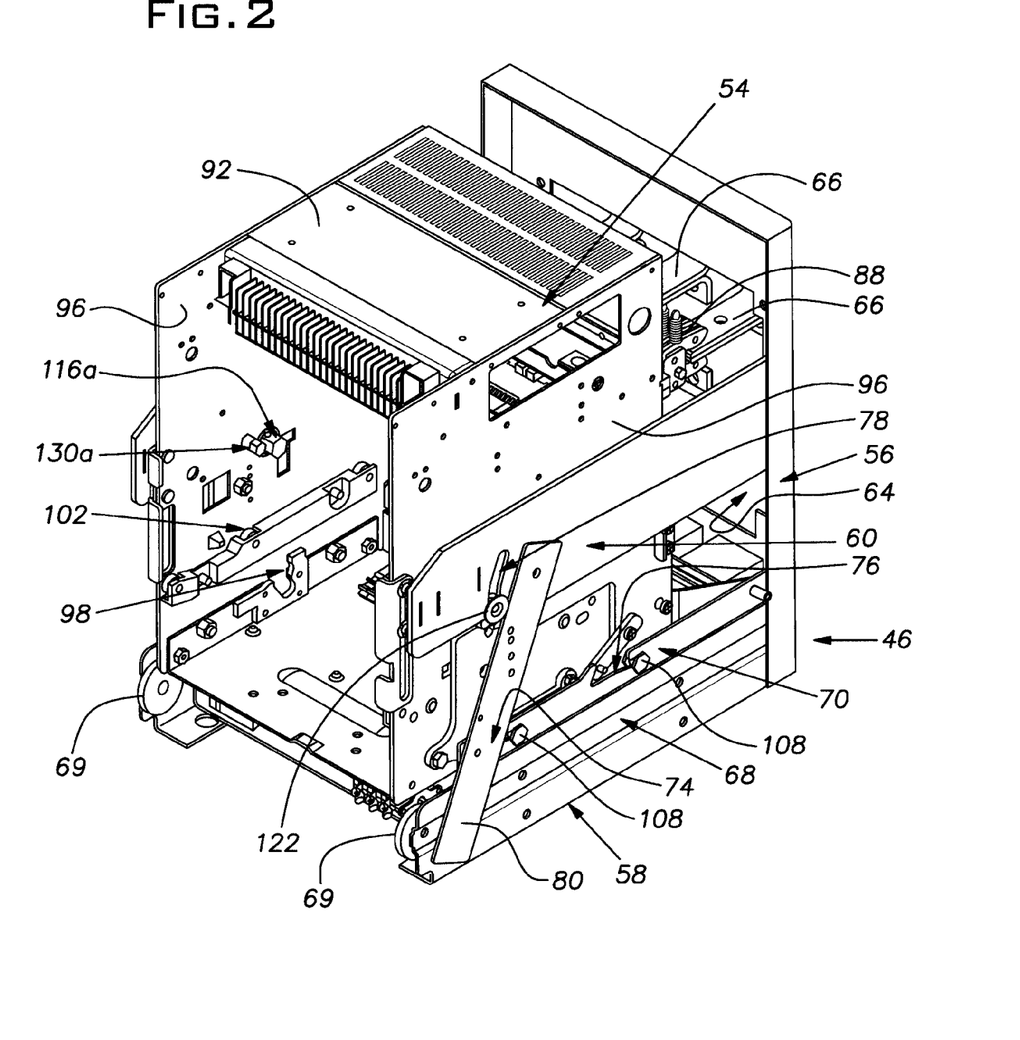
FIG. 2 is a right side perspective view of the cradle mounted to a substructure mounted inside a cell of the switchgear cabinet.
Figure 3:
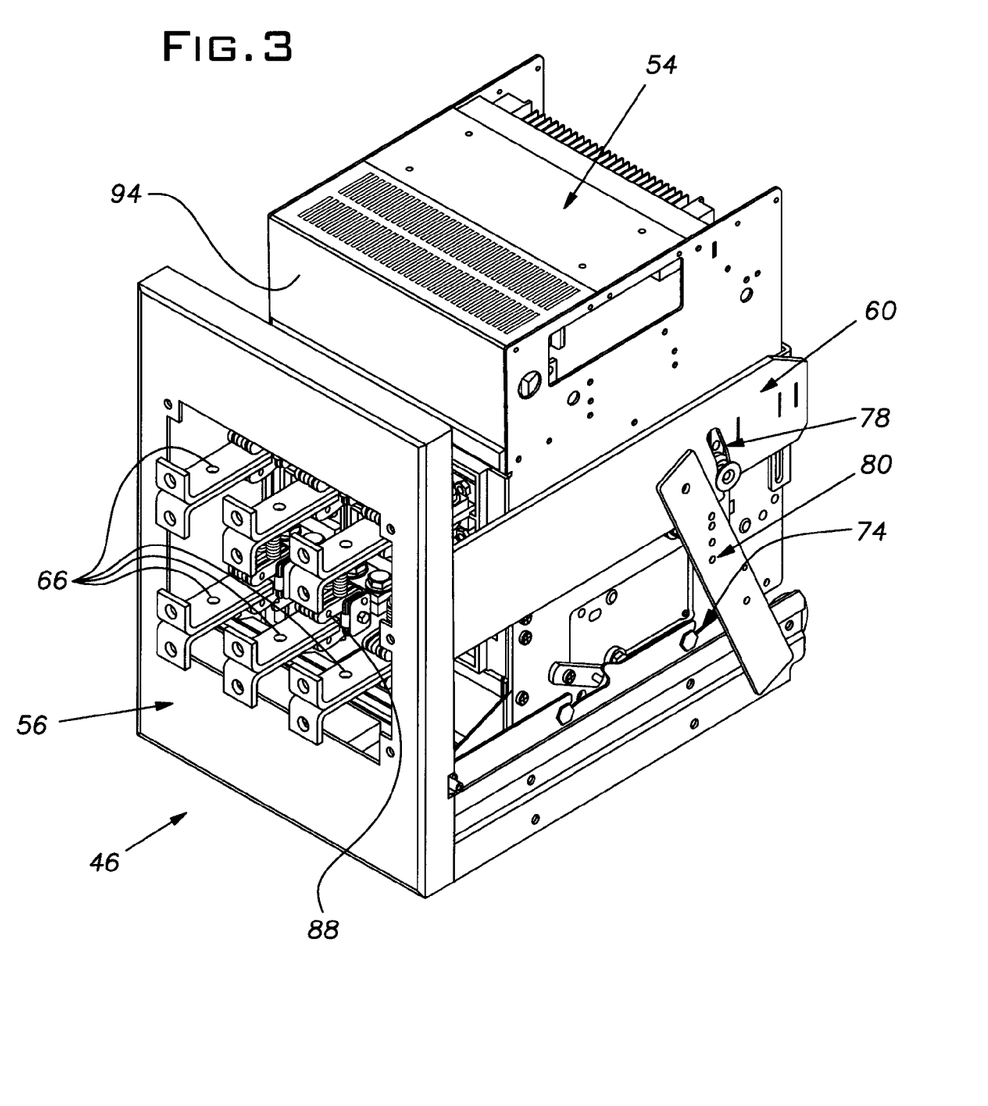
FIG. 3 is a rear left side perspective view of the cradle mounted to the substructure.

Referring now to FIGS. 2-3, the substructure 46 generally includes a rear end wall 56, a bottom frame 58 and a pair of side arms 60.

The rear end wall 56 is secured to a posterior end of the bottom frame 58 and extends upwardly therefrom. The rear end wall 56 includes an enlarged opening 64 through which stabs 66 may extend. The stabs 66 are connected to the bus bar system within the switchgear cabinet 40.

The bottom frame 58 includes a pair of spaced-apart side structures 68. A mounting track 70 is movably mounted to each side structure 68 using rollers 69. Each mounting track 70 is movable between an extended position, wherein a substantial portion of the mounting track 70 is disposed forward of a front end of the respective side structure 68, and a retracted position, wherein the entire mounting track 70 is disposed rearward of the front end of the respective side structure 68. Each mounting track 70 has front and rear grooves 74, 76 formed therein. Each of the front and rear grooves 74, 76 has a downwardly sloping notch portion.

The side arms 60 are spaced above the bottom frame 58 and are secured at their posterior ends to the rear end wall 56. Transverse support members 80 are secured between the side arms 60 and the side structures 68, respectively, and help support front portions of the side arms 60. A groove 78 is formed in each side arm 60, toward the front portion thereof. Each groove 78 slopes upwardly and rearwardly from a bottom opening. Each side arm 60 has a bottom edge with a rear portion that is disposed farther downward than a front portion in order to guide a portion of a racking arm 112 of the cradle 54 into the bottom opening of the groove 78, as will be described more fully below.

Figure 6:
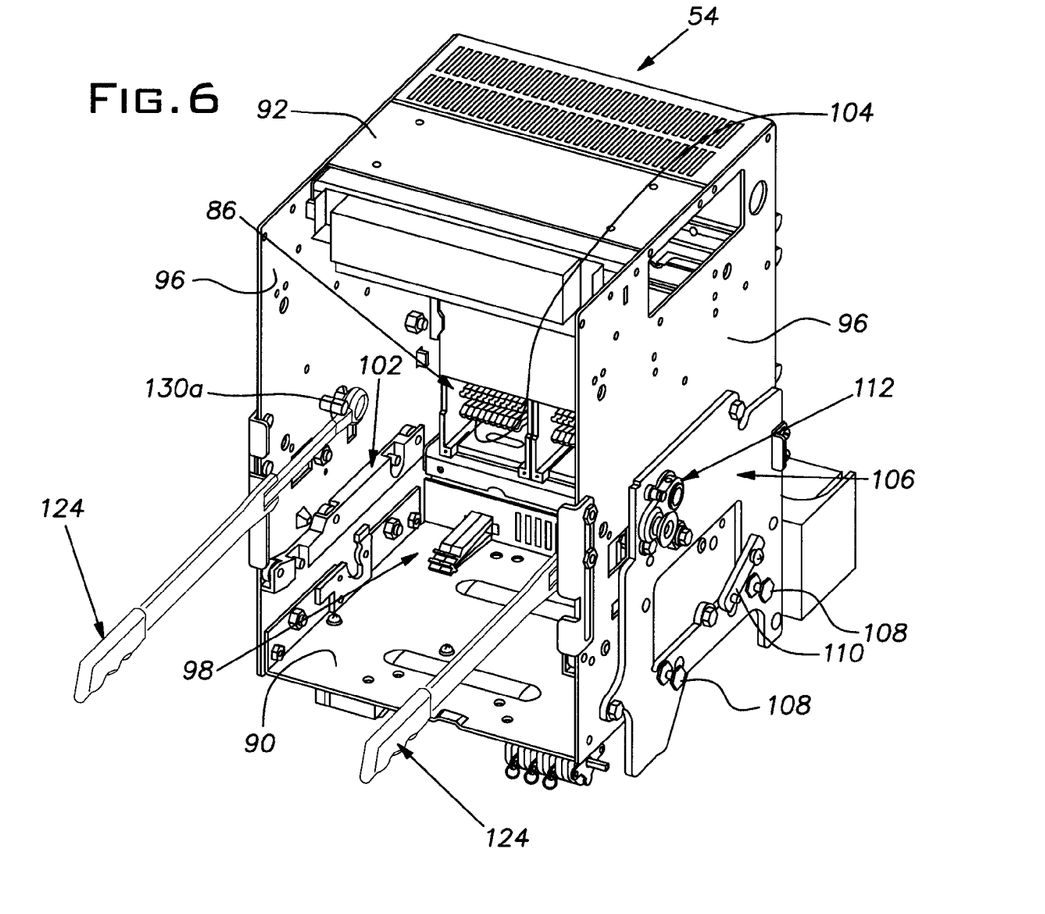
FIG. 6 is a front right side perspective view of the cradle.
Figure 7:
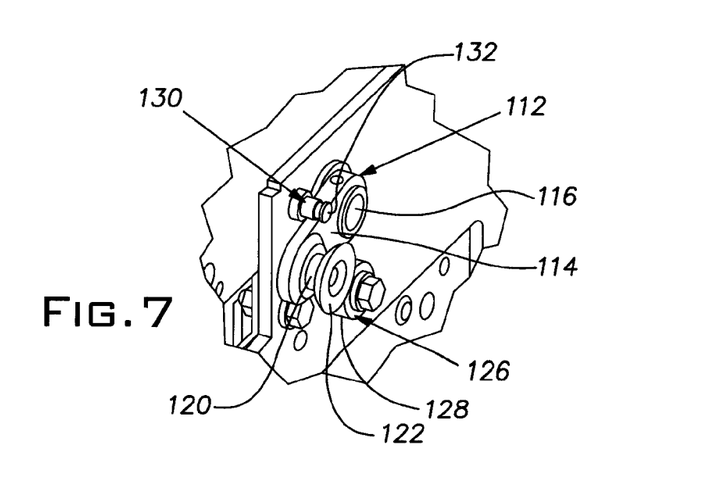
FIG. 7 is an enlarged view of a portion (Detail A) of the cradle shown in FIG. 6.

With particular reference now to FIGS. 3, 6 and 7, the cradle 54 is generally cubicle in shape and includes a bottom wall 90, a top wall 92, a rear wall 94 and opposing side walls 96, all of which cooperate to define a cavity 98 in which the second circuit breaker 50 may be disposed. Tracks 102 are mounted to the side walls 96, respectively, and are adapted to guide the travel of a second circuit breaker 50 into and out of the cavity 98 and to hold the second circuit breaker 50 in the cavity 98. The movement of the second circuit breaker 50 between disconnect and connect positions within the cavity 98 is performed by a racking mechanism of the second circuit breaker 50. The racking mechanism is actuated by a crank handle that is inserted into an opening in a front panel of the second circuit breaker 50. A plurality of the connectors 86 are secured to the rear wall and extend therethrough. Each connector 86 includes a pair of internal jaw structures 104 and a pair of external jaw structures 88. The internal jaw structures 104 are constructed for engaging and making electrical connections to the terminals of the second circuit breaker 50 when the second circuit breaker 50 is in the connect position. The external jaw structures 88 are constructed for engaging and making electrical connections to the stabs 66 when the cradle 54 is in the connect position. In this manner, the connectors 86 electrically connect the terminals of the second circuit breaker 50 to the stabs 66.

A pair of mounting plates 106 are secured to the side walls 96, respectively. A pair of studs 108 are secured to each mounting plate 106 and extend outward therefrom. A latch 110 is pivotally connected to each side wall 96 at a point above the rearmost stud 108. The latch 110 slopes downward and has a blocking pin at its free end. Above the frontmost stud 108 of each side wall 96, a racking arm 112 is pivotally mounted to the side wall 96.

The racking arms 112 are operable to move the cradle 54 between disconnect and connect positions within a substructure 46 mounted inside a cell 42. With particular reference to FIG. 7, each racking arm 112 includes an elongated body 114 having first and second ends. The first end of each racking arm 112 is secured to a shaft 116 that is journaled through an opening in the side wall 96 and extends into the cavity 98. The second end of each racking arm 112 is chamfered and is joined by a narrow post 120 to an outer disc-shaped retaining flange 122. A free end 116a (shown best in FIG. 2) of the shaft 116 that is disposed in the cavity 98 is shaped for gripping by a tool, such as a wrench 124 as will be described more fully below. The wrench 124 may be one-way ratcheting wrench. The free end 116a may be shaped to have a hexagonal circumferential surface or a circumferential surface with ridges or knurls. The racking arm 112 is rotatable between an initial position and an engaged position. When the racking arm 112 is in the initial position, the retaining flange 122 of the racking arm 112 rests against an arm rest 126 and is disposed forward of a locking pin 130. When the racking arm 112 is in the engaged position, the retaining flange 122 of the racking arm 112 is disposed rearward from the locking pin 130. The racking arm 112 rotates rearward (clockwise, as viewed from the right side wall 96 in FIG. 6) from the initial position to the engaged position.

As will be described more fully below, the movement of the racking arms 112 between their initial positions and their engaged positions, moves the cradle 54 between the disconnect position and the connect position within the substructure 46, respectively. When the cradle 54 is in the disconnect position, all of the connectors 86 are disconnected and spaced from the stabs 66, whereas when the cradle 54 is in the connect position, the connectors 86 are electrically connected to the stabs 66.

An arm rest 126 is secured to each side wall 96, below the racking arm 112. The arm rest 126 includes a cylinder 128 against which the racking arm 112 rests when it is in the initial position. Above the racking arm 112 of each side wall 96, a locking pin 130 extends through the side wall 96. The locking pin 130 includes a threaded middle section for threadably engaging a circular edge of the side wall 96 that defines an opening through which the locking pin 130 extends. The locking pin 130 further includes a first end portion 130a that is disposed inside the cavity 98 and a second end that is secured to a retainer 132 disposed adjacent to an exterior surface of the side wall 96. The retainer 132 may have spokes extending radially outward, as shown, or may be a disc-shaped flange. The first end portion 130a is shaped for gripping by a tool, such as the wrench 124 or another wrench of different construction. The first end portion 130a may be shaped to have a hexagonal circumferential surface (as shown) or by a circumferential surface with ridges or knurls.

Each locking pin 130 is threadably movable between a retracted position and an extended position. When the locking pins 130 are in the retracted positions, the retainers 132 are disposed against or in close proximity to outside surfaces of the side walls 96, respectively, and the locking pins 130 do not block the travel of the racking arms 12 between their initial positions and their engaged positions. In addition, when the locking pins 130 are in the retracted positions, the first ends 130a are spaced inwardly from inside surfaces of the side walls 96 and major portions of the locking pins 130 are disposed inside the cavity 98 of the cradle 54, which prevents a second circuit breaker 50 from being inserted inside the cavity 98. When the locking pins 130 are in the extended positions, however, the retainers 132 are spaced outward from the outside surfaces of the side walls 96, respectively, and the locking pins 130 block the travel of the racking arms 112 between their initial positions and their engaged positions. In addition, when the locking pins 130 are in the extended positions, the first ends 130a are disposed against or in close proximity to the inside surfaces of the side walls 96 and the locking pins 130 do not block the insertion of a second circuit breaker 50 into the cavity 98. In a manner related to the foregoing, when the locking pins 130 are in their retracted positions and the racking arms 112 are between their initial positions and their engaged positions, the racking arms 112 prevent the locking pins 130 from being moved to their extended positions.

Although it is desirable to move the locking pins 130 together between their retracted positions and extended positions in a coordinated manner, each locking pin 130 may be moved independently between its retracted and extended positions. Moreover, the location of only one locking pin 130 in the retracted position is sufficient to prevent a second circuit breaker 50 from being inserted inside the cavity 98.

It should be appreciated from the foregoing, the cradle 54 cannot be moved (through the operation of the racking arms 112) between its disconnect position and its connect position when a second circuit breaker 50 is disposed in the cavity 98 of the cradle 54. In addition, a second circuit breaker 50 can only be inserted in the cradle 54 when the cradle 54 is in the disconnect position or the connect position.

In a replacement operation, the first circuit breaker 48 in a cell 42 is tripped, the door 44 of the cell 42 is opened, the racking handle 8 is inserted into the first circuit breaker 48 and is rotated counter-clockwise until the first circuit breaker 48 is in the disconnect position. The first circuit breaker 48 is then pulled forward until the tracks 70 are pulled forward to their extended positions. Manually, or using a lifting yoke, the first circuit breaker 48 is lifted from the tracks 70 and moved away. With the door 44 still open and the tracks 70 in their extended positions, the cradle 54 is placed on the tracks 70 such that the studs 108 of the cradle 54 are disposed in the front and rear grooves 74, 76 of the tracks 70. The cradle 54 is then pushed inward, toward the cell 42, which causes the studs 108 to move through the front and rear grooves 74, 76 and the tracks 70 to move inward toward their retracted positions. The latches 110 on the cradle 54 are pushed downward to permit the blocking pins on the latches 110 to clear protuberances on the mounting tracks 70, which permits the cradle 54 to move inward to the point where the posts 120 of the racking arms 112 are aligned with the bottom openings of the grooves 78 in the side arms 60. At this point, the cradle 54 is in its disconnect position and is ready to be racked to its connect position. The locking pins 130 are threadably moved by suitable tools to their retracted positions, if they are not already there. The wrenches 24 (or other suitable tools) are then inserted into the cavity 98 and are engaged with the free ends 116a of the shafts 116 secured to the racking arms 112. Handles of the wrenches 24 are moved upward to rotate the shafts 116 and, thus, the racking arms 112 rearward. This rearward movement causes the posts 120 to travel upward and rearward along upper edges of the grooves 78, which is a cam-like action that causes the cradle 54 to move rearward into its connect position. At this point, the cradle 54 is fully disposed in the cell 42. The wrenches 24 are disengaged from the shafts 116 and removed from the cavity 98. The locking pins 130 are then threadably moved by suitable tools to their extended positions, which permits a second circuit breaker 50 to be inserted into the cavity 98 of the cradle 54. The second circuit breaker 50 (which is tripped) is inserted into the cavity 98 and racked to its connect position such that its terminals are engaged by and electrically connected to the internal jaw structures 104 of the connectors 86. With the second circuit breaker 50 so mounted, the cradle 54 cannot be moved out of its connect position because the second circuit breaker 50 prevents the locking pins 130 from being moved to their retracted positions. The door 44 of the cell 42 may then be closed.

It should be appreciated that in the description above, the racking arms 112 can be moved independent of each other to compensate for distortions in the cell 42, which sometimes occur over time.

In order to remove the cradle 54 from the cell 42, the door 44 is opened, the second circuit breaker 50 is racked to its disconnect position and removed from the cradle 54, the locking pins are moved to their retracted positions and the wrenches 24 are used to rotate the racking arms 112 forward. This forward movement causes the posts 120 to travel downward and forward along lower edges of the grooves 78, which is a cam-like action that causes the cradle 54 to move forward to its disconnect position. The cradle 54 is then pulled forward so that the studs 108 move forward through the front and rear grooves 74, 76 and the tracks 70 move outward to their extended positions. The cradle 54 is then disengaged from the tracks 70 and removed.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A cradle for adapting a circuit breaker for mounting in a cell of a switchgear cabinet having a bus bar system, the cradle comprising:
    a frame for holding the circuit breaker, the frame including a bottom structure and a pair of opposing side structures that help define a holding space for receiving the circuit breaker;
    a racking apparatus mounted to the frame, the racking apparatus being operable to move the cradle between a first position, wherein the cradle is not electrically connected to the bus bar system, and a second position, wherein the cradle is electrically connected to the bus bar system; and
    a locking apparatus mounted to the frame, the locking apparatus having first and second operating states, wherein when the locking apparatus is in the first operating state, the locking apparatus prevents the circuit breaker from being disposed in the holding space of the frame and allows the racking apparatus to move the cradle between the first and second positions, and when the locking apparatus is in the second operating state, the locking apparatus allows the circuit breaker to be disposed in the holding space of the frame and prevents the racking apparatus from moving the cradle between the first and second positions.

2. The cradle of claim 1, wherein the racking apparatus comprises a pair of racking arms movably mounted to the side structures of the frame, respectively.

3. The cradle of claim 2, wherein the racking arms are each movable between first and second positions, wherein movement of the racking arms between their first and second positions moves the cradle between its first and second positions.

4. The cradle of claim 3, wherein the racking arms are movable independent of each other.

5. The cradle of claim 3, wherein the locking apparatus comprises a pair of locking devices mounted to the side structures of the frame, respectively, and wherein each of the locking devices is associated with one of the racking arms.

6. The cradle of claim 5, wherein each locking device extends through the side structure of the frame to which the locking device is mounted and is movable between a retracted position and an extended position, wherein when the locking device is in the retracted position, an outer end portion of the locking device is disposed against the side structure and does not block the movement of the racking arm associated with the locking device, and wherein when the locking device is in the extended position, the outer end portion of the locking device is disposed outward from the side structure and blocks the movement of the racking arm associated with the locking device.

7. The cradle of claim 6, wherein for each locking device, when the locking device is in the extended position, an inner end portion of the locking device is disposed against the side structure and does not prevent the circuit breaker from being disposed in the holding space of the frame, and wherein for each locking device, when the locking device is in the retracted position, the inner end portion of the locking device is disposed inward from the side structure and prevents the circuit breaker from being disposed in the holding space of the frame.

8. The cradle of claim 7, wherein the locking devices threadably engage the side structures, respectively, and are threadably movable between the retracted and extended positions.

9. The cradle of claim 7, wherein when the locking devices are in the retracted positions, the racking arms pass over the outer end portions of the locking devices when the racking arms move between the first and second positions.

10. The cradle of claim 9, wherein the outer end portion of each of the locking devices comprises a radially outward-extending retainer, and wherein the inner end portion of each of the locking devices has a circumferential surface with a plurality planar faces.

11. A method of installing a circuit breaker in a cell of a switchgear cabinet having a pair of tracks disposed in the cell and a bus bar system, wherein the circuit breaker is not adapted for mounting in the cell, the method comprising the steps of:
    (a.) providing a cradle comprising:
        a frame for holding the circuit breaker, the frame including a plurality of wall structures that help define a holding space for receiving the circuit breaker;
        a racking apparatus mounted to the frame and operable to move the cradle between a first position, wherein the cradle is not electrically connected to the bus bar system, and a second position, wherein the cradle is electrically connected to the bus bar system; and
        at least one pin, each pin being movably mounted to one of the wall structures and having an inner end portion disposed inside the holding space and an outer end portion disposed outside the holding space;
    (b.) moving the tracks so as to extend out of the cell;
    (c.) placing the cradle on the tracks;
    (d.) moving the cradle and the tracks into the cell;
    (e.) actuating the racking apparatus to move the cradle to the second position;
    (f.) after the cradle is in the second position, moving the at least one pin so that the inner end portion of each pin is disposed proximate to the wall structure to which the pin is mounted; and
    (g.) placing the circuit breaker in the holding space of the cradle.

12. The method of claim 11, further comprising:
    before actuating the racking apparatus, moving the at least one pin so that the inner end portion of each pin is spaced from the wall structure to which the pin is mounted.

13. The method of claim 11, wherein the wall structures comprise a bottom structure and a pair of opposing side structures, and wherein the racking apparatus comprises a pair of racking arms movably mounted to the side structure, respectively.

14. The method of claim 13, wherein the racking arms are each movable between first and second positions, and wherein the step of actuating the racking apparatus to move the cradle to the second position comprises moving the racking arms from the first positions to the second positions.

15. The method of claim 14, wherein the at least one pin comprises a pair of pins threadably mounted to the side structures, respectively.

16. The method of claim 15, wherein the inner end portion of each pin of the locking devices has a circumferential surface that is adapted to be engaged by a tool, and wherein the step of moving the at least one pin comprises engaging each inner end portion of each pin with a tool and rotating the inner end portion to threadably move the pin.

17. The method of claim 15, wherein the racking apparatus further comprises a pair of shafts to which the racking arms are respectively mounted, the shafts being journaled through openings in the side structures, respectively, and each shaft comprising an inner end portion disposed in the holding space, the inner end portions having circumferential surfaces that are adapted to be engaged by a tool, and wherein the moving of the racking arms from the first positions to the second positions comprises engaging the inner end portions of the shafts with tools and rotating the inner end portions to move the racking arms.

18. The method of claim 17, wherein when the inner end portions of the pins are disposed proximate to the wall structure, outer end portions of the pins block the movement of the racking arms between the first and second positions.

* * * * *